(12) United States Patent
Manolakos et al.

(10) Patent No.: US 11,316,732 B2
(45) Date of Patent: Apr. 26, 2022

(54) USER EQUIPMENT PROCESSING FOR MULTI-TRP AND MU-MIMO COMMUNICATIONS

(71) Applicant: QUALCOMM Incorporated, San Diego, CA (US)

(72) Inventors: Alexandros Manolakos, San Diego, CA (US); Mostafa Khoshnevisan, San Diego, CA (US); Jing Sun, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 142 days.

(21) Appl. No.: 16/591,264

(22) Filed: Oct. 2, 2019

(65) Prior Publication Data

US 2020/0112478 A1    Apr. 9, 2020

(30) Foreign Application Priority Data

Oct. 5, 2018 (GR) .............................. 20180100461

(51) Int. Cl.
| | | |
|---|---|---|
| *H04L 12/24* | (2006.01) | |
| *H04L 5/00* | (2006.01) | |
| *H04L 41/0806* | (2022.01) | |
| *H04W 72/12* | (2009.01) | |
| *H04J 13/16* | (2011.01) | |
| *H04B 7/0452* | (2017.01) | |
| *H04W 56/00* | (2009.01) | |

(52) U.S. Cl.
CPC ....... *H04L 41/0806* (2013.01); *H04B 7/0452* (2013.01); *H04J 13/16* (2013.01); *H04L 5/0048* (2013.01); *H04W 72/12* (2013.01); *H04W 56/001* (2013.01)

(58) Field of Classification Search
CPC . H04L 41/0806; H04L 5/0048; H04B 7/0452; H04J 13/16; H04W 72/12
See application file for complete search history.

(56) References Cited

U.S. PATENT DOCUMENTS

| | | | |
|---|---|---|---|
| 2019/0349103 A1* | 11/2019 | Wang | .................. H04B 17/345 |
| 2020/0112478 A1* | 4/2020 | Manolakos | ......... H04L 41/0806 |
| 2020/0314881 A1* | 10/2020 | Bagheri | ............ H04W 72/1273 |

FOREIGN PATENT DOCUMENTS

WO    2017196398 A1    11/2017

OTHER PUBLICATIONS

Huawei et al.: "Design of DL DMRS for data transmission", 3GPP Draft; R1-1701692, vol. RAN WG1, no. Athens, Greece; Feb. 13, 2017-Feb. 17, 2017 Feb. 12, 2017 (Feb. 12, 2017), XP051208858.*

(Continued)

*Primary Examiner* — Kevin C. Harper
*Assistant Examiner* — Henry Baron
(74) *Attorney, Agent, or Firm* — Harrity & Harrity, LLP

(57) ABSTRACT

Various aspects of the present disclosure generally relate to wireless communication. In some aspects, a user equipment (UE) may receive an indication regarding a reference signal configuration for a multi-transmit receive point (TRP) communication of the UE, wherein the reference signal configuration relates to at least one serving port and at least one co-scheduled port associated with the multi-TRP communication; and process the multi-TRP communication based at least in part on the indication. Numerous other aspects are provided.

30 Claims, 5 Drawing Sheets

(56) References Cited

OTHER PUBLICATIONS

"Signaling of DMRS ports for SU/MU-MIMO", 3GPP Draft; R1-1717310, vol. RAN WG1, no. Prague, Czech Republic; Oct. 9, 2017-Oct. 13, 2017 Oct. 2, 2017 (Oct. 2, 2017), XP051352222.*
Huawei, et al., "Design of DL DMRS for Data Transmission", 3GPP TSG RAN WG1 Meeting#88, 3GPP Draft R1-1701692, vol. RAN WG1, No. Athens, Greece; Feb. 13, 2017-Feb. 17, 2017, Feb. 17, 2017 (Feb. 17, 2017), pp. 1-5, XP051208858, Retrieved from the Internet: URL: http://www.3gpp.org/ftp/Meetings_3GPP_SYNC/RAN1/Docs/, Sections 1-3.
Huawei, et al., "Signaling of DMRS Ports for SU/MU-MIMO", 3GPP TSG RAN WG1 Meeting #90bis, 3GPP Draft R1-1717310, vol. RAN WG1, No. Prague, Czech Republic; Oct. 9, 2017-Oct. 13, 2017, Oct. 2, 2017 (Oct. 2, 2017), 15 Pages, XP051352222, Retrieved from the Internet: URL: http://www.3gpp.org/ftp/tsg_ran/WG1_RL1/TSGR1_90b/Docs/ [retrieved on Oct. 2, 2017] Sections 1-3, Appendix A, Appendix B, Appendix C, Appendix D.
International Search Report and Written Opinion—PCT/US2019/054521—ISA/EPO—dated Jan. 17, 2020.

* cited by examiner

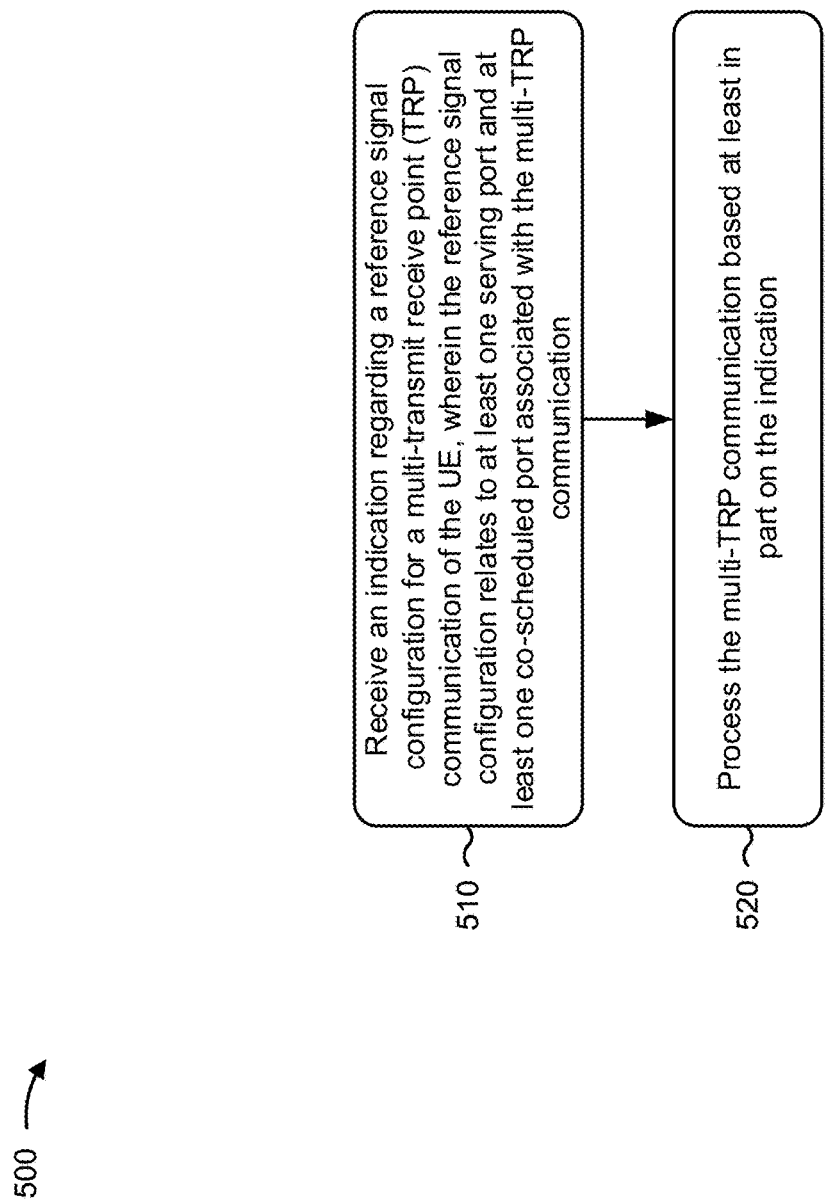

USER EQUIPMENT PROCESSING FOR MULTI-TRP AND MU-MIMO COMMUNICATIONS

CROSS-REFERENCE TO RELATED APPLICATION

This application claims priority to Greek Patent Application No. 20180100461, filed on Oct. 5, 2018, entitled "USER EQUIPMENT PROCESSING FOR MULTI-TRP AND MU-MIMO COMMUNICATIONS," which is hereby expressly incorporated by reference herein.

FIELD OF THE DISCLOSURE

Aspects of the present disclosure generally relate to wireless communication, and more particularly to techniques and apparatuses for user equipment (UE) processing for multi-transmit receive point (TRP) and multi-user multiple-input multiple-output (MU-MIMO) communications.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include receiving an indication regarding a reference signal configuration for a multi-transmit receive point (TRP) communication of the UE, wherein the reference signal configuration relates to at least one serving port and at least one co-scheduled port associated with the multi-TRP communication; and processing the multi-TRP communication based at least in part on the indication.

In some aspects, a UE for wireless communication may include memory and one or more processors operatively coupled to the memory. The memory and the one or more processors may be configured to receive an indication regarding a reference signal configuration for a multi-transmit receive point (TRP) communication of the UE, wherein the reference signal configuration relates to at least one serving port and at least one co-scheduled port associated with the multi-TRP communication; and process the multi-TRP communication based at least in part on the indication.

In some aspects, a non-transitory computer-readable medium may store one or more instructions for wireless communication. The one or more instructions, when executed by one or more processors of a UE, may cause the one or more processors to receive an indication regarding a reference signal configuration for a multi-transmit receive point (TRP) communication of the UE, wherein the reference signal configuration relates to at least one serving port and at least one co-scheduled port associated with the multi-TRP communication; and process the multi-TRP communication based at least in part on the indication.

In some aspects, an apparatus for wireless communication may include means for receiving an indication regarding a reference signal configuration for a multi-transmit receive point (TRP) communication of the UE, wherein the reference signal configuration relates to at least one serving port and at least one co-scheduled port associated with the multi-TRP communication; and means for processing the multi-TRP communication based at least in part on the indication.

Aspects generally include a method, apparatus, system, computer program product, non-transitory computer-readable medium, user equipment, base station, wireless communication device, and processing system as substantially described herein with reference to and as illustrated by the accompanying drawings, specification, and appendix.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 5 is a diagram illustrating an example process performed, for example, by a user equipment, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It is noted that while aspects may be described herein using terminology commonly associated with 3G and/or 4G wireless technologies, aspects of the present disclosure can be applied in other generation-based communication systems, such as 5G and later, including NR technologies.

Figure 1:
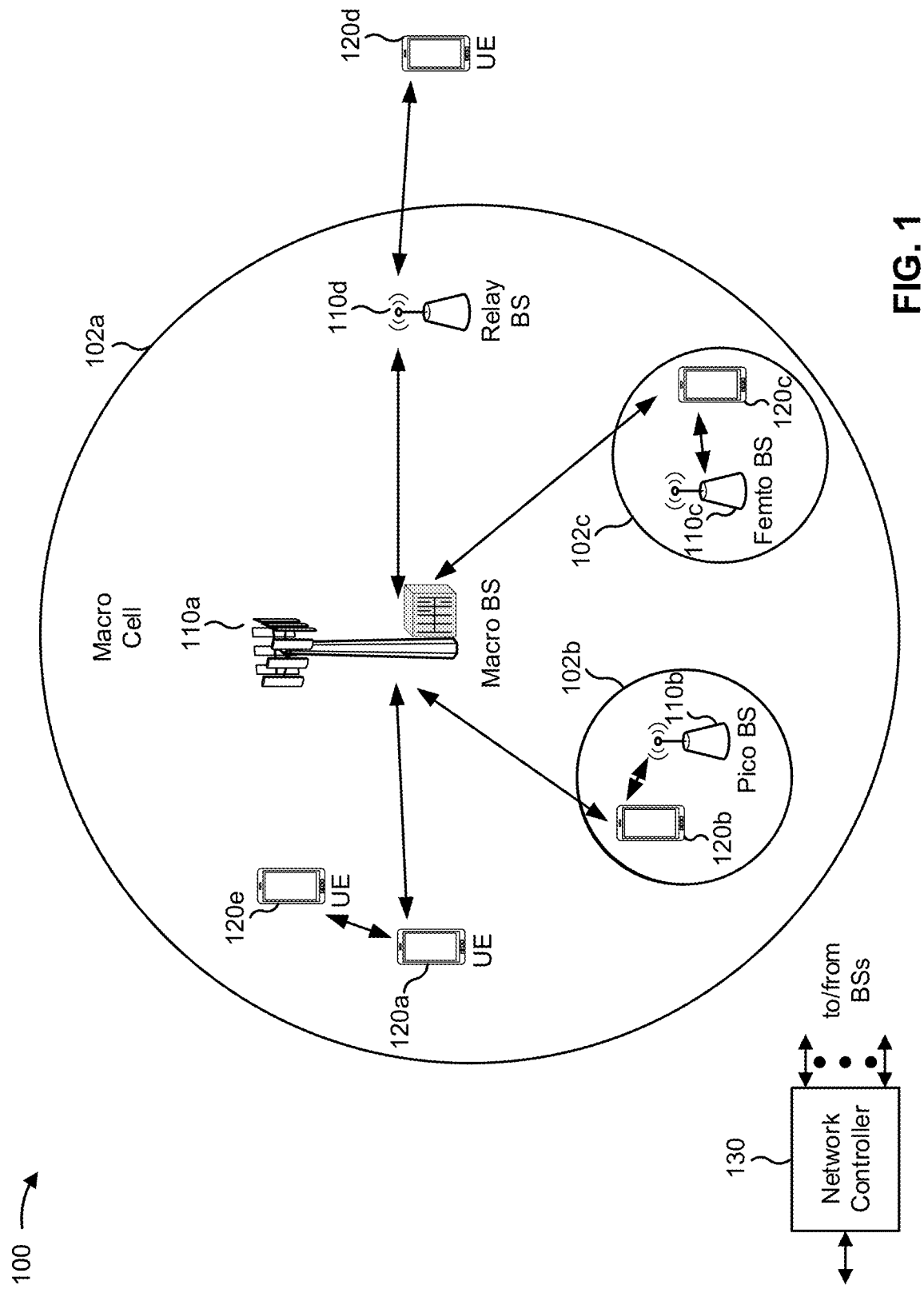
FIG. 1 is a block diagram conceptually illustrating an example of a wireless communication network, in accordance with various aspects of the present disclosure.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided merely as an example. Other examples may differ from what is described with regard to FIG. 1.

Figure 2:
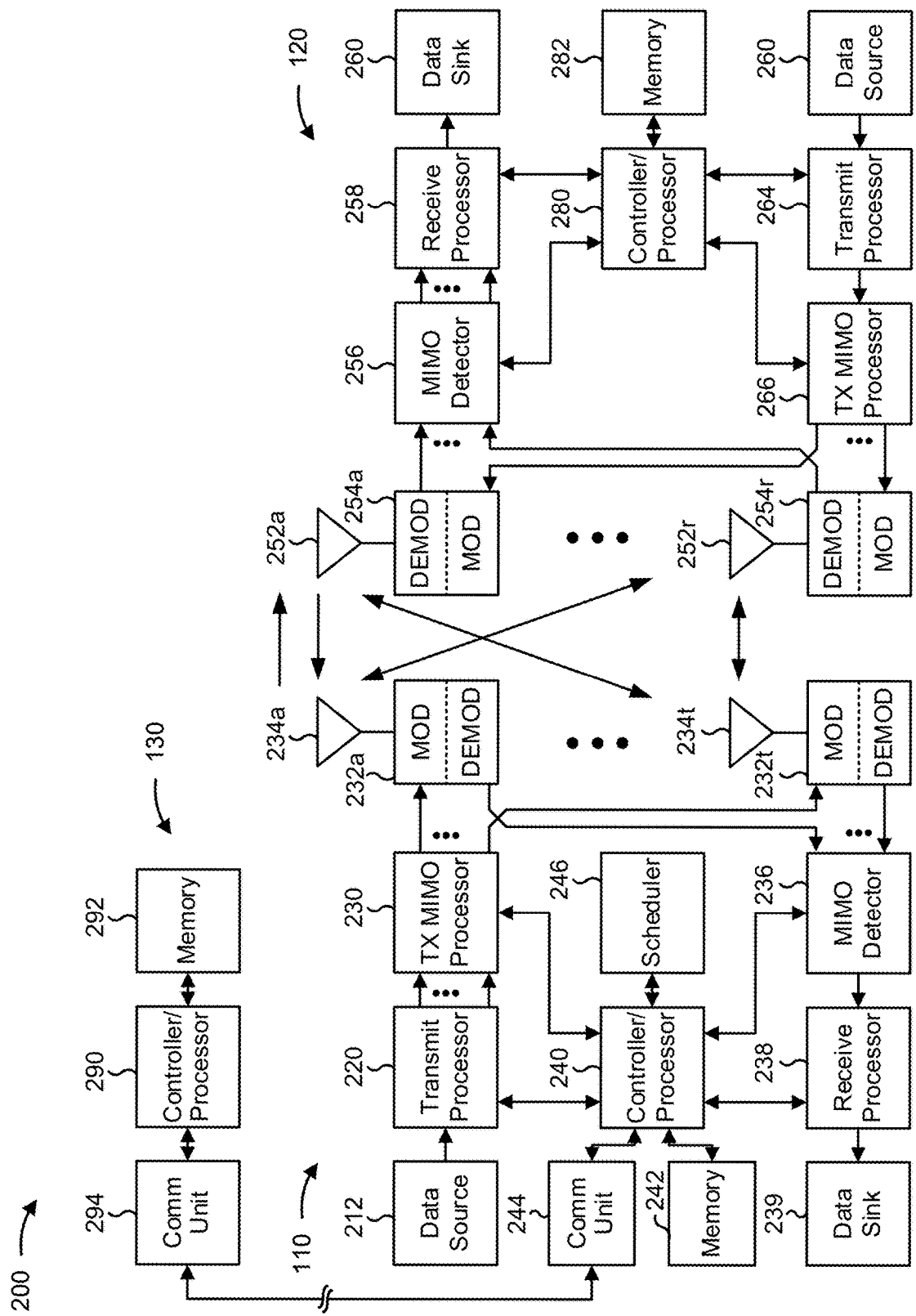
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with UE processing for MU-MIMO multi-TRP communications, as described in more detail elsewhere herein. For example, controller/processor 240 of base station 110, controller/processor 280 of UE 120, and/or any other component(s) of FIG. 2 may perform or direct operations of, for example, process 500 of FIG. 5 and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for receiving an indication regarding a reference signal configuration for a multi-transmit receive point (TRP) communication of the UE, wherein the reference signal configuration relates to at least one serving port and at least one co-scheduled port associated with the multi-TRP communication; means for processing the multi-TRP communication based at least in part on the indication; means for processing the multi-TRP communication based at least in part on an assumption that the at least one co-scheduled port and the at least one serving port are associated with a same one or more transmission filters corresponding to the same one or more TRPs; means for processing the multi-TRP communication based at least in part on an assumption that the at least one co-scheduled port and the at least one serving port are associated with a same one or more TRPs; means for processing the multi-TRP communication based at least in part on an assumption that the at least one co-scheduled port is associated with one or more TRPs that have a same physical cell identifier or scrambling identifier as one or more TRPs of the at least one serving port; means for processing the multi-TRP communication based at least in part on an assumption that the at least one co-scheduled port is quasi-collocated with a channel state information reference signal or a synchronization signal block that is a quasi-collocation reference signal source of the at least one serving port; means for processing the multi-TRP communication based at least in part on an assumption that the at least one co-scheduled port is associated with a scheduling allocation that is physical resource block group aligned with a scheduling allocation of the at least one serving port; means for processing the multi-TRP communication based at least in part on an assumption that the at least one co-scheduled port is not co-scheduled with the at least one serving port; means for providing information indicating one or more assumptions, of the plurality of assumptions, that are supported by the UE; and/or the like. In some aspects, such means may include one or more components of UE 120 described in connection with FIG. 2.

As indicated above, FIG. 2 is provided merely as an example. Other examples may differ from what is described with regard to FIG. 2.

A radio access technology (e.g., 5G/NR and/or the like) may provide for communication between a UE and multiple transmit receive points (TRPs). For example, two or more TRPs may transmit information to a particular UE. The information may include a same transmission block, and/or may occur contemporaneously or non-contemporaneously. In some aspects, the two or more TRPs may communicate with each other on a backhaul (e.g., an ideal backhaul or a non-ideal backhaul) to coordinate communication with the UE. The information transmitted to the UE may include a downlink control channel (e.g., a physical downlink control channel (PDCCH)), a downlink shared channel (e.g., a physical downlink shared channel (PDSCH)), a reference signal, and/or the like.

Furthermore, 5G/NR may enable MU-MIMO, wherein a UE may receive multiple streams or layers of information from a TRP. In such a case, one or more UEs may be assigned multiple ports on which to receive a communication (e.g., a physical resource block (PRB) and/or the like). For example, a first UE may be assigned a first set of ports and a second UE may be assigned a second set of ports different than the first set of ports. A UE may estimate a channel based at least in part on the ports and may decode the communication based at least in part on estimating the channel. In some aspects, the UE may be assigned DMRS ports on an OFDM symbol which may contain both DMRS and a corresponding data transmission of the UE.

A TRP may perform code division multiplexing (CDM) to encode multi-port transmissions. For example, the TRP may perform CDM based at least in part on CDM groups, wherein a first CDM group is used for a first set of ports, a second CDM group is used for a second set of ports, and so on.

It may result in high processing complexity or bad performance if the TRPs perform code division multiplexing of a transmission that is transmitted by multiple TRPs. For this reason, it may be undesirable for DMRS ports in the same CDM group to be transmitted by different TRPs. For this reason, in some aspects, in the multi-TRP transmission case, ports of a first DMRS port group and ports of a second DMRS port group may be constrained to not belong to the same CDM group. This may lead to complexity in the case of decoding multi-TRP communications.

The complexity may further increase when MU-MIMO and multi-TRP communications are used. For example, a set of UEs may be assigned respective ports for MU-MIMO. Due to the constraints described above, there may be some cases in which the respective multi-TRP communications of the set of UEs are code division multiplexed with each other. For example, assume a first UE is associated with a DMRS port group of {0 2} and a second UE is associated with a DMRS port group of {1 3}. Furthermore, assume a first CDM group of {0 1} and a second CDM group of {2 3}. In that case, communications of the first UE and the second UE may be code division multiplexed in the same CDM group, which effectively creates interference for the first UE and the second UE. For the first UE to effectively (e.g., optimally) process the multi-TRP communication, the first UE may need to estimate all four ports (e.g., to identify interference associated with the second UE on ports 1 and 3). Furthermore, there may be no guarantee that a co-scheduled port of the first UE (e.g., port 1 or 3) comes from the same TRP as a serving port of the UE (e.g., port 0 or 2). Therefore, the UE may not be able to apply longer-term statistics or a priori long-term knowledge for the co-scheduled port that the UE may be able to apply for the serving port, thereby diminishing processing efficiency of the UE.

Some techniques and apparatuses described herein improve efficiency of estimating a multi-TRP communication that uses MU-MIMO. For example, a UE may use one or more assumptions, described elsewhere herein, that may simplify the processing of a co-scheduled port associated with a serving port of the UE. In some aspects, the UE may determine whether one or more of these assumptions is to be used, or may assume that no other port is co-scheduled, based at least in part on an indicator received from a TRP. In some aspects, the UE may report capabilities of the UE that indicate which of the assumptions are supported by the UE and/or particular conditions in which an assumption is supported. Thus, the UE may perform channel estimation for a MU-MIMO multi-TRP communication based at least in part on one or more assumptions, which improves performance of the UE with regard to channel estimation and reduces computational complexity for the UE.

Figure 3:
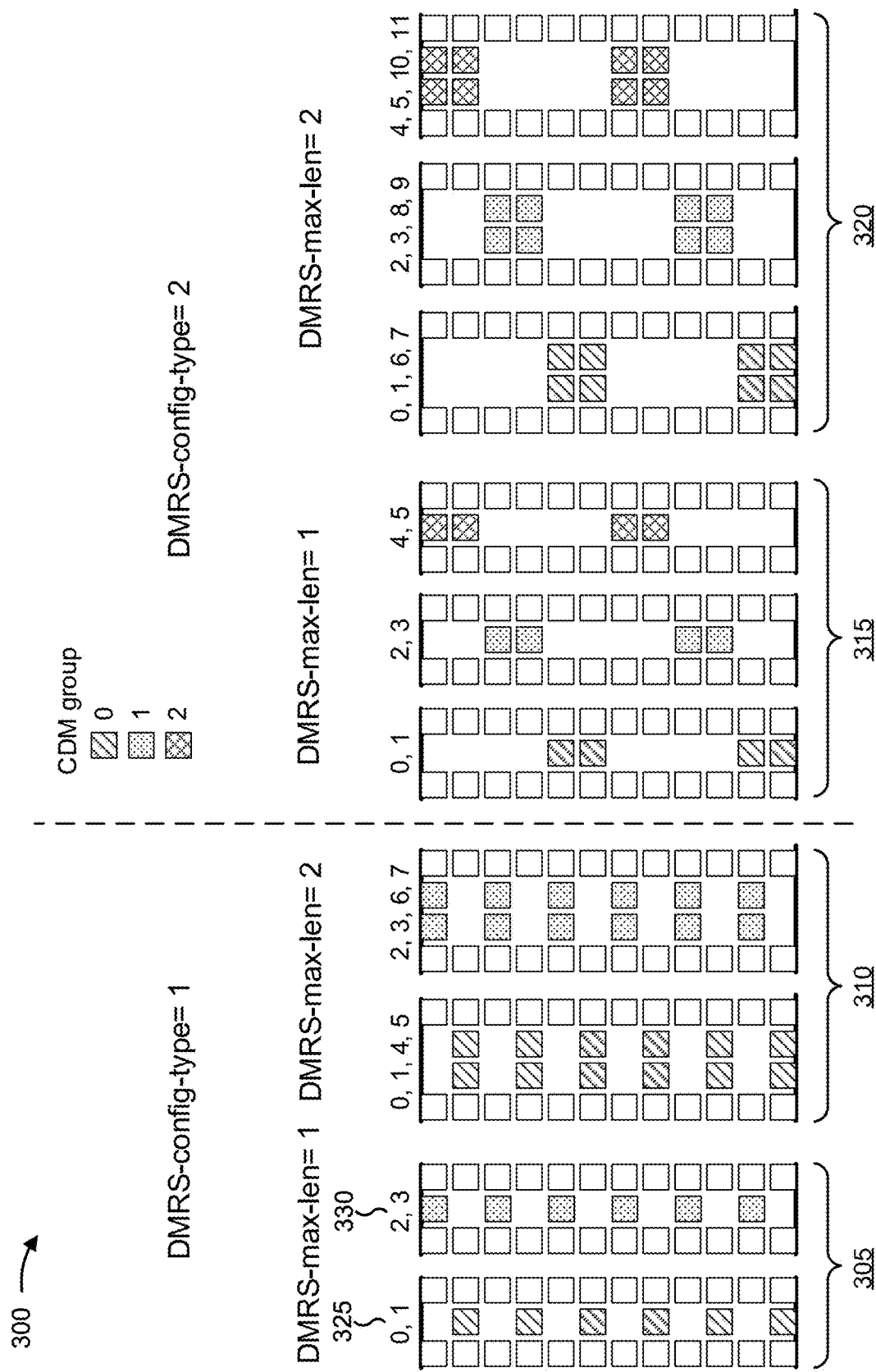
FIG. 3 is a diagram illustrating an example of code-division multiplexing groups for multi-user multiple-input multiple-output, in accordance with various aspects of the present disclosure.

FIG. 3 is a diagram illustrating an example 300 of code-division multiplexing groups for multi-user multiple-input multiple-output, in accordance with various aspects of the present disclosure. CDM group configurations for a DMRS configuration type 1 are shown on the left, and CDM group configurations for a DMRS configuration type 2 are shown on the right. The horizontal axis represents time resources (e.g., symbols) and the vertical axis represents frequency resources (e.g., tones, subcarriers, etc.).

Reference number 305 shows CDM group configurations for a DMRS of a maximum length 1 for DMRS configuration type 1, and reference number 310 shows CDM group configurations for a DMRS of maximum length 2 for DMRS configuration type 1. Reference number 315 shows CDM group configurations for a DMRS of a maximum length 1 for DMRS configuration type 1, and reference number 320 shows a CDM group configurations for a DMRS of maximum length 2 for DMRS configuration type 2.

The CDM group configurations of FIG. 3 are described with reference to the CDM group configuration shown by reference number 305. As shown by reference number 325, a first CDM group (shown by a diagonal hatching) may use a first set of tones of a symbol. As shown by reference number 330, a second CDM group (shown by a dotted hatching) may use a second set of tones of the symbol. For example, the first CDM group and the second CDM group may be transmitted on a same symbol, but are shown separately here for clarity. As shown, the first CDM group and the second CDM group use alternating frequency resources based at least in part on a comb pattern (e.g., the first CDM group and the second CDM group may be frequency division multiplexed). The first CDM group may include a code division multiplexed signal composed of the signals associated with ports 0 and 1, and the second CDM group may include a code division multiplexed signal composed of the signals associated with ports 2 and 3.

A downlink grant may indicate which CDM group is to be used for a DMRS. In one example, the downlink grant may be provided in DCI, such as DCI format 1_1. As an example, the downlink grant may indicate the CDM group based at least in part on the following table (e.g., from Section 7.3.1.2.2 of 3GPP Technical Specification 38.212):

TABLE 1

One codeword:
Codeword 0 enabled, Codeword 1 disabled

| Value | Number of DMRS CDM group(s) without data | DMRS port(s) |
|---|---|---|
| 0 | 1 | 0 |
| 1 | 1 | 1 |
| 2 | 1 | 0, 1 |
| 3 | 2 | 0 |
| 4 | 2 | 1 |
| 5 | 2 | 2 |
| 6 | 2 | 3 |
| 7 | 2 | 0, 1 |
| 8 | 2 | 2, 3 |
| 9 | 2 | 0-2 |
| 10 | 2 | 0-3 |
| 11 | 3 | 0 |
| 12 | 3 | 1 |
| 13 | 3 | 2 |
| 14 | 3 | 3 |
| 15 | 3 | 4 |
| 16 | 3 | 5 |
| 17 | 3 | 0, 1 |
| 18 | 3 | 2, 3 |
| 19 | 3 | 4, 5 |
| 20 | 3 | 0-2 |
| 21 | 3 | 3-5 |
| 22 | 3 | 0-3 |
| 23 | 2 | 0, 2 |
| 24-31 | Reserved | Reserved |

This table is used for the DMRS configuration type 2, maximum length 1 case (e.g., shown by reference number 315). In this table, the middle column indicates the number of DMRS CDM groups that do not carry data. For example, refer to the top row. In the top row, port 1 is used for the DMRS, so the CDM group associated with port 1 is used for the DMRS (e.g., CDM group 0, associated with ports 0 and 1). In that case, the other CDM group (e.g., CDM group 1, associated with ports 2 and 3) may be used for data (since only one CDM group is not used for data according to the signaling).

It may be difficult or impossible to code division multiplex a set of ports that are transmitted by different TRPs. For example, the difference in receive power at the UE may make decoding of the set of ports difficult or impossible. Therefore, it may be required that a set of ports to be used for MU-MIMO, multi-TRP communication with a UE be associated with different CDM groups. For example, a first port may be associated with a first CDM group and may be transmitted by a first TRP and a second port may be associated with a second CDM group and may be transmitted by a second TRP.

A MU-MIMO transmission to a UE may be associated with a DMRS group. A DMRS group may be defined in accordance with an antenna port table. One such antenna port table is provided below, for DMRS configuration type 1 and 1 front-loaded symbol:

TABLE 2

| Number of ports (first port group, second port group) | DMRS ports |
|---|---|
| (1, 1) | {0}, {2} |
| (1, 1) | {1}, {3} |
| (2, 1) | {0, 1}, {2} |

TABLE 2-continued

| Number of ports (first port group, second port group) | DMRS ports |
| --- | --- |
| (2, 1) | {2, 3}, {0} |
| (2, 2) | {0, 1}, {2, 3} |

In the above table, it can be seen that if a UE is to receive a multi-TRP communication, then the multi-TRP communication may be associated with the first row of the table or the second row of the table (since the DMRS ports are associated with CDM groups 0 and 1, as defined by reference number 305 of FIG. 3). This may reduce the risk of unsuccessful decoding of MU-MIMO communications by the UE.

As described above, it may be computationally expensive for the UE to estimate the channel when using DMRS group {0 2} or {1 3} (or another DMRS group). For example, when a CDM group is associated with a serving port of a UE (e.g., a port directed to the UE) and a co-scheduled port (e.g., a port directed to a different UE), then the UE may need to estimate the port and the co-scheduled port to perform successful or optimal processing.

As indicated above, FIG. 3 is provided as an example. Other examples may differ from what is described with respect to FIG. 3.

Figure 4:
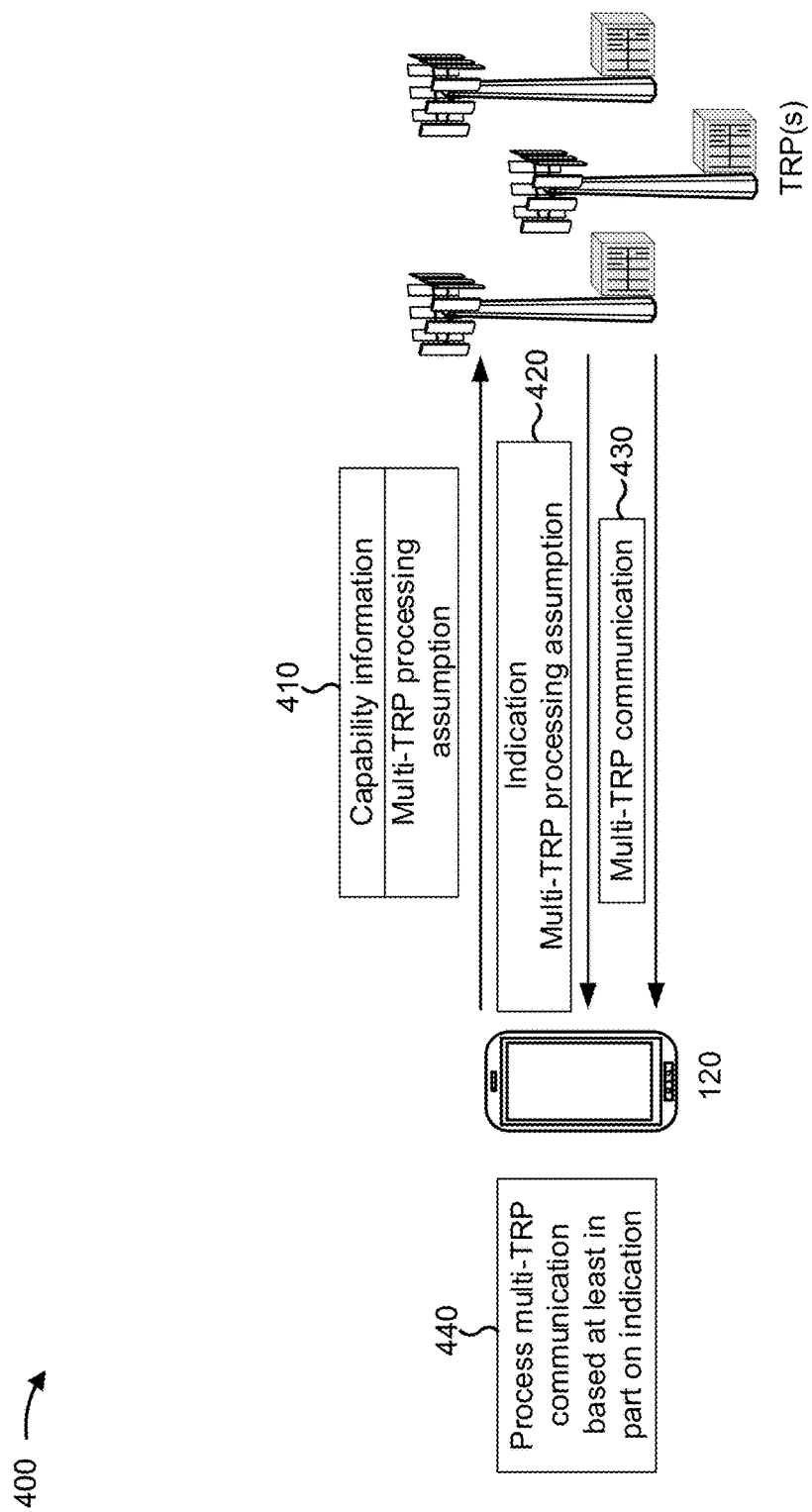
FIG. 4 is a diagram illustrating an example of UE processing for MU-MIMO and multi-TRP communication, in accordance with various aspects of the present disclosure.

FIG. 4 is a diagram illustrating an example 400 of UE processing for MU-MIMO and multi-TRP communication, in accordance with various aspects of the present disclosure. The operations described in connection with FIG. 4 may be performed by a UE 120 and one or more TRPs (e.g., BSs 110). The one or more TRPs are described in some cases below as "a TRP" for brevity.

As shown in FIG. 4, and by reference number 410, a UE 120 may provide capability information to a TRP. The capability information may indicate one or more assumptions for processing a multi-TRP communication. In some cases, an assumption may be referred to herein as a relaxation. In some aspects, the UE 120 may indicate one or more assumptions, of a plurality of assumptions, that the UE 120 supports. In some aspects, the capability information may indicate multiple sets of assumptions. For example, the UE 120 may provide information indicating multiple sets of assumptions that correspond to different combinations of serving ports and co-scheduled ports. As a more particular example, the UE 120 may provide information indicating that no assumption is needed when the UE 120 is scheduled with only a serving port and no co-scheduled ports, and may provide information indicating that the UE 120 supports one or more assumptions in the case of one or more co-scheduled ports.

In some aspects, an assumption may modify a procedure for estimating a channel associated with a port. For example, an assumption may relate to at least one serving port (e.g., a port scheduled for the UE 120) and at least one co-scheduled port (e.g., a port scheduled for a different UE and part of a same CDM as a serving port of the UE 120). In some aspects, a serving port may include a port that is scheduled to provide data for the UE120. In some aspects, a co-scheduled port may be a port scheduled or assigned for a UE other than the UE 120. For example, the co-scheduled port may be associated with the same CDM group as a serving port of the UE 120, and/or the other UE (associated with the co-scheduled port) may be part of an MU-MIMO pairing with the UE 120.

As a first example, an assumption may indicate that the UE 120 can assume that a co-scheduled port is transmitted by the same TRP as a serving port. As a second example, an assumption may indicate that the UE 120 can assume that a co-scheduled port is transmitted by the same TRP and using the same transmission filter as a serving port. As a third example, an assumption may indicate that the UE 120 can assume that a co-scheduled port is transmitted by a TRP with the same physical cell identifier or scrambling identifier as a TRP that transmitted the serving port. As a fourth example, an assumption may indicate that the at least one co-scheduled port is quasi-collocated with a channel state information reference signal or a synchronization signal block that is a quasi-collocation reference signal source of the at least one serving port. As a fifth example, an assumption may indicate that the UE 120 can process the at least one co-scheduled port based at least in part on a scheduling allocation that is physical resource block group aligned with a scheduling allocation of the at least one serving port. These assumptions may reduce the processing load of the UE 120 for processing the co-scheduled port and the serving port.

In some aspects, the UE 120 may process the multi-TRP communication based at least in part on an assumption that there is no co-scheduled port. For example, the UE 120 may process the multi-TRP communication in accordance with a single-user MIMO approach.

In some aspects, the UE 120 may provide information indicating which of the above assumptions are supported by the UE 120. For example, the UE 120 may provide this information using capability signaling (e.g., statically), as described in connection with reference number 410. In some aspects, the UE 120 may determine which of the above assumptions are supported by the UE 120. In some aspects, the UE 120 may receive information indicating which of the above assumptions are supported by the UE 120 (e.g., radio resource control information, a medium access control control element, etc.).

In some aspects, the UE 120 may selectively provide the capability information. For example, the UE 120 may provide the capability information based at least in part on a determination that at least one serving port of the UE 120 is associated with a co-scheduled port. As another example, the UE 120 may not provide the capability information when no serving port of the UE 120 is associated with a co-scheduled port in the same CDM group as a serving port, since the UE 120 can choose not to process the co-scheduled port in this case without significant performance degradation.

As shown by reference number 420, the TRP may provide an indication to the UE 120. For example, the indication may indicate which assumption, of the assumptions described above, is to be used to process a multi-TRP communication. In some aspects, the TRP may provide the indication using downlink control information (DCI). For example, the TRP may provide the indication using the scheduling DCI of a data channel (e.g., a PDSCH) corresponding to the DMRS of the UE 120.

In some aspects, the indication may be based at least in part on an antenna port table, such as the Table 3 described above. For example, in one case, the indication may indicate whether the UE 120 is to process the multi-TRP communication in accordance with a single user MIMO approach, or using one of the other assumptions (e.g., relaxations) described herein. This indication may be provided using an additional row in the antenna port table, as shown below:

TABLE 3

| #of ports (first port group, second port group) | DMRS ports |
| --- | --- |
| (1, 1) | {0}, {2} |
| (1, 1) | {1}, {3} |
| (1, 1) | {0}, {2}, SU |

As shown, Table 3 includes a third row indicating that a DMRS port group {0 2} is to be processed in accordance with the single-user (SU) MIMO approach. When the scheduling DCI indicates the first row of Table 3, the UE 120 may process the multi-TRP communication in accordance with one of the assumptions (e.g., relaxations) described above other than the single-user MIMO approach. When the scheduling DCI indicates the third row of Table 3, the UE 120 may process the multi-TRP communication in accordance with the single-user MIMO approach. Thus, no additional DCI bit may be needed to toggle between the MU-MIMO assumption and the single-user MIMO approach.

As shown by reference number 430, the one or more TRPs may provide a multi-TRP communication to the UE 120. For example, the one or more TRPs may transmit the multi-TRP communication using the at least one serving port and the at least one co-scheduled port. In some aspects, the one or more TRPs may include multiple antenna panels of a single TRP (e.g., quasi-collocated or not quasi-collocated). In some aspects, the one or more TRPs may include multiple TRPs at different locations.

As shown by reference number 440, the UE 120 may process the multi-TRP communication based at least in part on the assumption. For example, the UE 120 may receive the multi-TRP communication. The UE 120 may perform channel estimation for the at least one serving port based at least in part on an assumption identified by the indication. In some aspects, the UE 120 may determine an estimation for the at least one serving port and the at least one co-located port based at least in part on the assumption. In some aspects, the UE 120 may determine an estimation for only the at least one serving port based at least in part on the assumption. The UE 120 may demodulate and/or decode the multi-TRP communication based at least in part on the estimation. Thus, multi-TRP communication in the MU-MIMO case is improved by reducing estimation processor load for the UE 120.

Notably, the above techniques can be applied when two or more TRPs transmit a different number of layers for the UE 120. Furthermore, the above techniques can be applied when two or more UEs 120 are co-scheduled, and when some of the two or more UEs 120 receive a downlink data channel in a multi-TRP mode and others of the two or more UEs 120 receive a downlink data channel in a single-TRP mode. Still further, the above techniques can be applied for overlapping TRP clusters, wherein, for example, TRP 1 serves UE 1 and UE 2, TRP 2 serves UE 1 and UE 3, and TRP 3 serves UE 2 and UE 3.

As indicated above, FIG. 4 is provided as an example. Other examples may differ from what is described with regard to FIG. 4.

FIG. 5 is a diagram illustrating an example process 500 performed, for example, by a UE, in accordance with various aspects of the present disclosure. Example process 500 is an example where a UE (e.g., UE 120) performs processing for MU-MIMO multi-TRP communications.

As shown in FIG. 5, in some aspects, process 500 may include receiving an indication regarding a reference signal configuration for a multi-transmit receive point (TRP) communication of the UE, wherein the reference signal configuration relates to at least one serving port and at least one co-scheduled port associated with the multi-TRP communication (block 510). For example, the UE (e.g., using antenna 252, DEMOD 254, MIMO detector 256, receive processor 258, controller/processor 280, and/or the like) may receive an indication regarding a reference signal configuration for a multi-TRP communication of the UE. The reference signal configuration may relate to (e.g., identify) at least one serving port and at least one co-scheduled port associated with the multi-TRP communication.

As shown in FIG. 5, in some aspects, process 500 may include processing the multi-TRP communication based at least in part on the indication (block 520). For example, the UE (e.g., using antenna 252, DEMOD 254, MIMO detector 256, receive processor 258, controller/processor 280, and/or the like) may process the multi-TRP communication based at least in part on the indication. In some aspects, the UE may apply one or more of the assumptions described below and elsewhere herein to process the multi-TRP communication, thereby conserving processor resources of the UE.

Process 500 may include additional aspects, such as any single aspect or any combination of aspects described below and/or in connection with one or more other processes described elsewhere herein.

In a first aspect, processing the multi-TRP communication based at least in part on the indication further comprises processing the multi-TRP communication based at least in part on an assumption that the at least one co-scheduled port and the at least one serving port are associated with a same one or more TRPs.

In a second aspect, alone or in combination with the first aspect, processing the multi-TRP communication based at least in part on the indication further comprises processing the multi-TRP communication based at least in part on an assumption that the at least one co-scheduled port and the at least one serving port are associated with a same one or more transmission filters corresponding to the same one or more TRPs.

In a third aspect, alone or in combination with any one or more of the first through second aspects, processing the multi-TRP communication based at least in part on the indication further comprises processing the multi-TRP communication based at least in part on an assumption that the at least one co-scheduled port is associated with one or more TRPs that have a same physical cell identifier or scrambling identifier as one or more TRPs of the at least one serving port.

In a fourth aspect, alone or in combination with any one or more of the first through third aspects, processing the multi-TRP communication based at least in part on the indication further comprises processing the multi-TRP communication based at least in part on an assumption that the at least one co-scheduled port is quasi-collocated with a channel state information reference signal or a synchronization signal block that is a quasi-collocation reference signal source of the at least one serving port.

In a fifth aspect, alone or in combination with any one or more of the first through fourth aspects, processing the multi-TRP communication based at least in part on the indication further comprises processing the multi-TRP communication based at least in part on an assumption that the at least one co-scheduled port is associated with a scheduling allocation that is physical resource block group aligned with a scheduling allocation of the at least one serving port.

In a sixth aspect, alone or in combination with any one or more of the first through fifth aspects, processing the multi-TRP communication based at least in part on the indication further comprises processing the multi-TRP communication based at least in part on an assumption that the at least one co-scheduled port is not co-scheduled with the at least one serving port.

In a seventh aspect, alone or in combination with any one or more of the first through sixth aspects, the indication is received using a scheduling downlink control information for a data channel of the multi-TRP communication. In an eighth aspect, alone or in combination with any one or more of the first through seventh aspects, the indication identifies a row of an antenna port table that indicates an assumption to be used for processing the multi-TRP communication. In a ninth aspect, alone or in combination with any one or more of the first through eighth aspects, the indication identifies an assumption, of a plurality of assumptions, to be used for processing the multi-TRP communication. In a tenth aspect, alone or in combination with any one or more of the first through ninth aspects, the UE may provide information indicating one or more assumptions, of the plurality of assumptions, that are supported by the UE. In an eleventh aspect, alone or in combination with any one or more of the first through tenth aspects, the information indicating the one or more assumptions that are supported by the UE identifies multiple sets of assumptions that correspond to different combinations of serving ports and co-scheduled ports. In a twelfth aspect, alone or in combination with any one or more of the first through eleventh aspects, the information indicating the one or more assumptions relates to a case when the at least one co-scheduled port is associated with a same code division multiplexing group as any port scheduled for the UE.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
 providing, to a transmit receive point (TRP), first information indicating a first assumption that:
  at least one co-scheduled port, of the TRP, is associated with the UE and another UE, and
  at least one serving port, of the TRP, is associated with the UE,
   wherein the first assumption is associated with a capability of the UE in
  processing a multi-TRP communication;
 receiving, from the TRP, second information indicating a reference signal configuration for the multi TRP communication, wherein the reference signal configuration relates to the at least one serving port and the at least one co-scheduled port; and
 processing the multi-TRP communication based at least in part on the first assumption.

2. The method of claim 1, wherein processing the multi-TRP communication further comprises:
 processing the multi-TRP communication based at least in part on a second assumption that the at least one co-scheduled port and the at least one serving port are associated with a same one or more transmission filters corresponding to the TRP.

3. The method of claim 1, wherein processing the multi-TRP communication further comprises:
 processing the multi-TRP communication based at least in part on a second assumption that the at least one co-scheduled port is associated with one or more TRPs that have a same physical cell identifier or scrambling identifier as the TRP.

4. The method of claim 1, wherein processing the multi-TRP communication further comprises:
processing the multi-TRP communication based at least in part on a second assumption that the at least one co-scheduled port is quasi-collocated with a channel state information reference signal or a synchronization signal block that is a quasi-collocation reference signal source of the at least one serving port.

5. The method of claim 1, wherein processing the multi-TRP communication further comprises:
processing the multi-TRP communication based at least in part on a second assumption that the at least one co-scheduled port is associated with a scheduling allocation that is physical resource block group aligned with a scheduling allocation of the at least one serving port.

6. The method of claim 1, wherein processing the multi-TRP communication further comprises:
processing the multi-TRP communication based at least in part on a second assumption that the at least one co-scheduled port is not co-scheduled with the at least one serving port.

7. The method of claim 1, wherein the second information is received using a scheduling downlink control information for a data channel of the multi-TRP communication.

8. The method of claim 1, wherein the second information identifies antenna port information indicative of the first assumption.

9. The method of claim 1, wherein the second information identifies the first assumption.

10. The method of claim 9, further comprising:
providing third information indicating a second assumption supported by the UE.

11. The method of claim 10, wherein the second assumption corresponds to a different serving port or a different co-scheduled port.

12. The method of claim 10, wherein the second assumption relates to when the at least one co-scheduled port is associated with a same code division multiplexing group as any port scheduled for the UE.

13. A user equipment (UE) for wireless communication, comprising:
a memory; and
one or more processors coupled to the memory, wherein the one or more processors are configured to:
provide, to a transmit receive point (TRP), first information indicating a first assumption that:
at least one co-scheduled port, of the TRP, is associated with the UE and another UE, and
at least one serving port, of the TRP, is associated with the UE, wherein the first assumption is associated with a capability of the
UE in processing a multi-TRP communication;
receive, from the TRP, second information indicating a reference signal configuration for the multi TRP communication, wherein the reference signal configuration relates to the at least one serving port and the at least one co-scheduled port; and
process the multi-TRP communication based at least in part on the first assumption.

14. The UE of claim 13, wherein, to process the multi-TRP communication, the one or more processors are further configured to:
process the multi-TRP communication based at least in part on a second assumption that the at least one co-scheduled port and the at least one serving port are associated with a same one or more transmission filters corresponding to the TRP.

15. The UE of claim 13, wherein, to process the multi-TRP communication, the one or more processors are further configured to:
process the multi-TRP communication based at least in part on a second assumption that the at least one co-scheduled port is associated with one or more TRPs that have a same physical cell identifier or scrambling identifier as the TRP.

16. The UE of claim 13, wherein, to process the multi-TRP communication, the one or more processors are further configured to:
process the multi-TRP communication based at least in part on a second assumption that the at least one co-scheduled port is quasi-collocated with a channel state information reference signal or a synchronization signal block that is a quasi-collocation reference signal source of the at least one serving port.

17. The UE of claim 13, wherein, to process the multi-TRP communication, the one or more processors are further configured to:
process the multi-TRP communication based at least in part on a second assumption that the at least one co-scheduled port is associated with a scheduling allocation that is physical resource block group aligned with a scheduling allocation of the at least one serving port.

18. The UE of claim 13, wherein, to process the multi-TRP communication, the one or more processors are further configured to:
process the multi-TRP communication based at least in part on a second assumption that the at least one co-scheduled port is not co-scheduled with the at least one serving port.

19. The UE of claim 13, wherein the second information is received using a scheduling downlink control information for a data channel of the multi-TRP communication.

20. The UE of claim 13, wherein the second information identifies antenna port information indicative of the first assumption.

21. The UE of claim 13, wherein the second information identifies the first assumption.

22. The UE of claim 21, wherein the one or more processors are further configured to:
provide third information indicating a second assumption supported by the UE.

23. The UE of claim 22, wherein the second assumption corresponds to a different serving port or a different co-scheduled port.

24. The UE of claim 22, wherein the second assumption relates to when the at least one co-scheduled port is associated with a same code division multiplexing group as any port scheduled for the UE.

25. A non-transitory computer-readable medium having instructions stored thereon that, when executed, cause a user equipment (UE), to:
provide, to a transmit receive point (TRP), first information indicating a first assumption that:
at least one co-scheduled port, of the TRP, is associated with the UE and another UE, and
at least one serving port, of the TRP, is associated with the UE,
wherein the first assumption is associated with a capability of the
UE in processing a multi-TRP communication;

receive, from the TRP, second information indicating a reference signal configuration for the multi TRP communication, wherein the reference signal configuration relates to the at least one serving port and the at least one co-scheduled port; and process the multi-TRP communication based at least in part on the first assumption.

26. A first apparatus for wireless communication, comprising:

means for providing, to a transmit receive point (TRP), first information indicating a first assumption that:
at least one co-scheduled port, of the TRP, is associated with the first apparatus and a second apparatus, and
at least one serving port, of the TRP, is associated with the first apparatus,
wherein the first assumption is associated with a capability of the first
apparatus in processing a multi-TRP communication;
means for receiving, from the TRP, second information indicating a reference signal configuration for the multi TRP communication, wherein the reference signal configuration relates to the at least one serving port and the at least one co-scheduled port; and
means for processing the multi-TRP communication based at least in part on the first assumption.

27. The method of claim 1, wherein the second information is received based at least in part on providing the first information.

28. The method of claim 1, wherein the UE supports a plurality of assumptions for processing the multi-TRP communication, and wherein the plurality of assumptions includes the first assumption.

29. The first apparatus of claim 26, wherein the second information is received based at least in part on providing the first information.

30. The first apparatus of claim 26, wherein the first apparatus supports a plurality of assumptions for processing the multi-TRP communication, and wherein the plurality of assumptions includes the first assumption.

\* \* \* \* \*